United States Patent [19]

Shikinami

[11] Patent Number: 4,762,899
[45] Date of Patent: Aug. 9, 1988

[54] AMPHIPHILIC SEGMENT POLYURETHANES

[75] Inventor: Yasuo Shikinami, Osaka, Japan

[73] Assignee: Takiron Co., Ltd., Osaka, Japan

[21] Appl. No.: 49,356

[22] Filed: May 14, 1987

[30] Foreign Application Priority Data

May 14, 1986 [JP] Japan ................... 61-111477

[51] Int. Cl.⁴ ............................................. C08G 18/08
[52] U.S. Cl. ........................................ 528/49; 528/65;
528/66; 528/69; 528/74.5; 528/76; 528/80;
528/83
[58] Field of Search ............... 528/49, 65, 66, 69,
528/74.5, 76, 80, 83

[56] References Cited

U.S. PATENT DOCUMENTS 4,677,181  6/1987  Hohlein et al. ................ 528/76

Primary Examiner—Maurice J. Welsh
Attorney, Agent, or Firm—Sughrue, Mion, Zinn, Macpeak, and Seas

[57] ABSTRACT

The present invention provides multiblock hydrophilicity-hydrophobicity tapered amphiphilic segment polyurethanes represented by the following general formula (A):

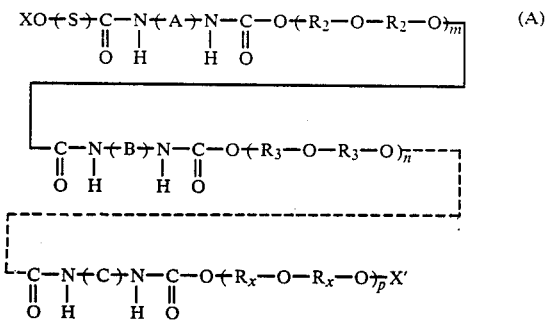

wherein (S) is (a) a polyalkylene oxide segment represented by the following general formula (I):

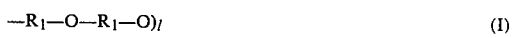

(b) an aliphatic polyester segment which is the reaction product of a dibasic acid and a dihydric alcohol represented by the following general formula (II):

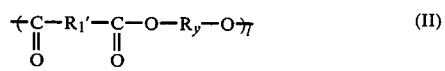

or (c) a polyester segment which is the reaction product of a ring-cleaved polymer of a cyclic ester and a dihydric alcohol represented by the following general formula (III):

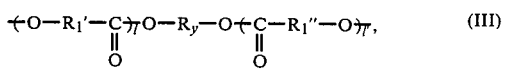

11 Claims, No Drawings ns of protei# AMPHIPHILIC SEGMENT POLYURETHANES

FIELD OF THE INVENTION

The present invention relates to amphiphilic segment polyurethanes, and more precisely, to multiblock hydrophilicity-hydrophobicity tapered amphiphilic segment polyurethanes containing alkylene oxide segments in the polymer molecule arranged to provide a stepwise decrease in hydrophilicity from one end of the polymer molecule to the other with a corresponding increase in hydrophobicity. Such urethanes can be used for various purposes, for example, as polymer emulsifiers and solubilizers for medicines, agricultural chemicals, perfumes, cosmetics, etc., or as separation membranes, liquid membranes, ion conductive materials, bases for drugs with sustained release, precipitating agents for fractionation of proteins, etc., by utilizing the difference in the hydrophilicity or hydrophobicity of each segment in the polymer molecule.

BACKGROUND OF THE INVENTION

Conventional alkylene oxide block copolymers include, for example, $HO \text{-} (C_2H_4O)_{\overline{a}}(C_3H_6O)_{\overline{b}}(C_2H_4O)_{\overline{a}}H$ (a=2 to 70, b=10 to 50), formed by block copolymerization of a water-insoluble polypropylene glycol and ethylene oxide, and $HO \text{-} (C_3H_6O)_{\overline{a}}(C_2H_4O)_{\overline{b}}(C_3H_6O)_{\overline{a}}H$ (a=2 to 70, b=10 to 50), formed by block copolymerization of polyethylene glycol and propylene oxide as described in *Chemistry Express*, Vol. 1, No. 10, pp. 615 to 618 (1986). These block copolymers are nonionic polymeric surfactants containing a variety of combinations of hydrophilic alkylene oxide segments (the term "segment" as used herein unless otherwise indicated refers to an alkylene oxide segment) and hydrophobic segments.

In addition, various multiblock segment polyurethanes have been synthesized, containing polyether compound segments such as polyethylene oxides, polypropylene oxides, polytetramethylene oxides, etc., as soft blocks and segments that are the reaction product of a short chain diol or diamine and a diisocyanate as hard blocks. The physical properties of these polyurethanes are being investigated in detail to permit their use as fiber materials or elastomer materials. In this case, the kinds of soft segments and hard segments, and their relative proportions, as well as the crystallinity and morphology of the polymers resulting from the intermolecular force between the individual segments therein are mainly studied from the viewpoint of the mechanical and physiological characteristics of the polymers.

In general, the chemical structure of surfactants necessarily includes a hydrophilic group and a lipophilic group in one surfactant molecule, and such surfactants are called amphiphilic substances. In particular, these include polymers which can form stable colloidal particles like micelles of low molecular surfactants, when dissolved in a liquid, which may be a solvent either for the hydrophilic segment or the hydrophobic segment. Such polymers are currently being studied. Block copolymers having both hydrophilic segments and hydrophobic segments (along with graft copolymers having both segments) are called amphiphilic polymers.

In block copolymers, the characteristics of each segment, and in particular, its hydrophilicity or hydrophobicity, are important, and are determined by the hydrogen bond, Van der Waals force or ionic bond between each segment of the copolymer and a low molecular compound, ion, water, metal, etc., as well as the physicochemical characteristics of the molecular aggregate composed of the polymer and the low molecular compound (including, for example, the hydrophilicity-hydrophobicity interaction between the polymer and water or a solvent, the influence of ions on the stereostructure and phase separation of the polymer, the interaction between the polymer and a surfactant appearing in the cluster formation therebetween, etc.). Unlike known copolymers as described, for example, in *Polymers Preprints Japan*, Vol. No. 35, No. 7, the amphiphilic block copolymers of the present invention contain segments chosen to permit specific interactions between the polymer and a low molecular compound, especially in consideration of the degree of the hydrophilicity or the hydrophobicity of the segments.

However, since segment polyurethanes are block copolymers which have a structure made up of a combination of plural segments bonded by the urethane bond, these have many useful characteristics (such as viscoelasticity, etc.) which are not found in other block copolymers having a structure composed of directly bonded segments. These characteristics, in combination with the effective utilization of the hydrophilicity or hydrophobicity of each segment, permit various additional applications of segment polyurethanes besides their use as polymeric surfactants.

SUMMARY OF THE INVENTION

Accordingly, one object of the present invention is to provide segment polyurethanes having a characteristic relation of hydrophilicity or hydrophobicity between their alkylene oxide segments, which can be adapted to various uses, including, for example, polymeric emulsifiers or solubilizers for medicines, agricultural chemicals, perfumes, cosmetics, etc., as well as separation membranes, liquid membranes, ion conductive materials, bases for drugs with sustained release, precipitating agents for fractionation of proteins, etc.

A second object of the invention is to provide amphiphilic segment polyurethanes having greatly improved strength and viscoelasticity.

A further object is to provide a tapered amphiphilic segment polyurethane having improved melting point characteristics and interactions with other chemical substances.

An additional object of the present invention is an amphiphilic segment polyurethane base for drug compositions, having improved controlled release properties.

Yet another object of the present invention is an improved separation membrane containing amphiphilic segment polyurethanes, having enhanced selectivity.

As a result of extensive investigations, it has now been found that these and other objects of the present invention can be attained by the amphiphilic segment polyurethanes represented by general formula (A):

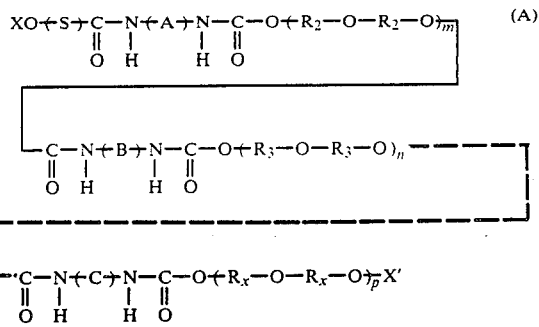

(A)

wherein (S) is selected from the group consisting of (a) a polyalkylene oxide segment represented by the following general formula (I):

(I)

(b) an aliphatic polyester segment which is the reaction product of a dibasic acid and a dihydric alcohol represented by the following general formula (II):

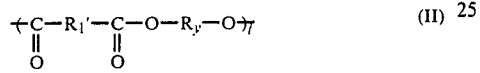

(II)

and (c) a polyester segment which is the reaction product of a ring-cleaved polymer of a cyclic ester and a dihydric alcohol represented by the following general formula (III):

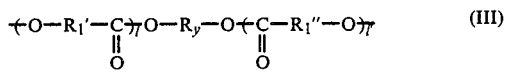

(III)

wherein $R_1$ to $R_x$ each represents an alkylene group having from 7 to 2 carbon atoms, which may be unsubstituted or substituted with a side chain (e.g., a methyl group, an ethyl group and a propyl group), forming an alkylene oxide segment; $R_y$ represents an alkylene group of polyester-forming dihydric alcohol; $R_1'$ and $R_1''$, which may be the same or different, each represents an alkylene group having from 7 to 2 carbon atoms; —OX represents a group selected from the group consisting of

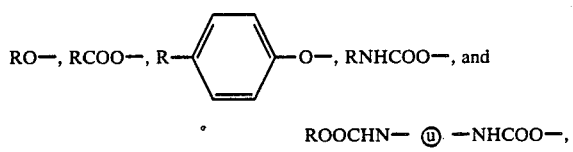

wherein R represents an alkyl group having 1 to 18 carbon atoms or a vinyl group and ⓘ represents an isocyanate skeleton group; —OX' represents a group selected from the group consisting of —OH, —OCl, —OBr and —OF; (A), (B) and (C), which may be the same or different, each represents an isocyanate skeleton group; m, n, p, l and l' each is a positive integer; l and l' may be the same or different; said polyurethane being a tapered hydrophobicity-hydrophilicity polyurethane.

These segments are so constituted that the lipophilicity or hydrophobicity is made larger with the approach to the polyester segment or polyalkylene segment of forming the (S)-segment at one end of the polymer and that the hydrophilicity of the polyalkylene oxide segment is made larger with the approach to the opposite end of the polymer.

DETAILED DESCRIPTION OF THE INVENTION

The amphiphilic segment polyurethanes of the present invention represented by the structural formula (A) have a structure comprising a linkage of polyalkylene oxide segments or polyalkylene oxide-polyester segments bonded by a urethane bond, where the degree of the hydrophilicity or hydrophobicity of each segment is regulated such that a stepwise relation of hydrophilic and hydrophobic segments is obtained from one end of the polymer molecule to the other, and the hydrophilicity or the hydrophobicity of the segments is tapered throughout the whole polymer molecule. The most characteristic feature of the amphiphilic segment polyurethanes of the present invention is the tapered hydrophilicity-hydrophobicity segment structure. Specifically, the basic characteristic of the present amphiphilic segment polyurethanes is the tapered variation of the hydrophilicity-hydrophobicity of the segments resulting from the difference of hydrophilicity or hydrophobicity of the respective segments, and any structure exhibiting the relationship of tapered hydrophilicity-hydrophobicity in every adjacent segment groups falls within the scope of the present invention. The amphiphilic segment polyurethanes of the present invention preferably have a molecular weight of about 1,500 to 20,000, more preferably about 2,500 to 15,000.

In general formula (A), the alkylene oxides, in which —(S)— is a polyalkylene oxide segment represented by formula (I) of —(R₁—O—R₁—O)ₗ, have alkylene chains ($R_1$, $R_2$, $R_3$ . . . $R_x$) each having 7 or fewer carbon atoms, and, for example, include polyoxymethylene glycol PMG (having an alkylene chain with 1 carbon atom), polyethylene glycol PEG (having an alkylene chain with 2 carbon atoms), polypropylene glycol PPG (having an alkylene chain with 3 carbon atoms), polytetramethylene glycol PTMG (having an alkylene chain with 4 carbon atoms), polypentamethylene glycol PPMG (having an alkylene chain with 5 carbon atoms), polyhexamethylene glycol PHEMG (having an alkylene chain with 6 carbon atoms) and polyheptamethylene glycol PHPMG (having an alkylene chain with 7 carbon atoms). These polymers preferably have a low degree of polymerization, since higher polymers are difficult to incorporate as segments in view of the synthetic technique used. The molecular weight of these polyesters is preferably about 200 to 5,000, more preferably about 500 to 3,000. Among these examples, a low polymerized PMG having a polymerization degree of about 100 or less is easily decomposed; and PPMG is difficult to synthesize by the ring cleavage polymerization of a 6-membered tetrahydropyran ring. Accordingly, it is preferred that the polyalkylene oxides be selected from PEG, PPG, PTMG, PHEMG and PHPMG. In general, as is well known in the art, polyalkylene oxides are synthesized by the ring cleavage polymerization of cyclic ether compounds, and the polymers have the characteristic that fewer methylene groups in the alkylene oxide result in a higher hydrophilicity, since the ratio of the ether oxygens therein is higher, while more methylene groups in the alkylene oxide result in a higher hydrophobicity, since the ratio of the ether oxygens therein is lower. For example, the ratio of the ether oxygens and the carbon numbers in polyhexamethylene glycol, polytetramethylene glycol, polypropylene glycol and polyethylene glycol is 1/6, ¼, ⅓ and ½, respectively. Accordingly, alkylene oxides having a high number of methylene groups, e.g., more than about 3 carbon atoms, are said to be hydrophobic or lipophilic. However, the hydrophobic effect varies depending upon the increase of the molecular weight thereof. This is because the affinity of the ether oxygens in the alkylene oxides with water, and the association of the ether oxygens and water, is inhibited by the steric hindrance of the methylene group chains, rendering the alkylene oxides having more methylene groups hydrophobic. In other words, the increase of the methylene groups in alkylene oxides increases the hydrophobicity of the alkylene oxides. Without being limited by theory, the reason is considered to be as follows:

When an alkylene oxide is brought into contact with water, contact of the segment with water is reduced as much as possible since there is no affinity between the methylene group and water, and the molecule is most stable when the hydrating area is small. This selfassociation phenomenon is called a hydrophobic interaction. In order to decrease the hydrophobic contact with water, the molecule assumes a shape that increases its volume. Accordingly, the number of $CH_2$ units in the alkylene group has a great influence on the increase of volume. In particular, alkylene oxides having more $CH_2$ groups are more hydrophobic. In addition, in the case of polyalkylene oxides, a higher degree of polymerization increases the hydrophobic effect resulting from the monomer unit. Therefore, polyalkylene oxide segments having alkylene chains with 5 or more carbon atoms are generally lipophilic rather than hydrophobic.

The following Table 1 shows the relation between the polymerization degree and theoretical solubility parameter value (SP value: $\delta[cal/cm^3]^{\frac{1}{2}}$), which provides a base for the determination of hydrophilicity or hydrophobicity of polymers, with respect to PEG, PPG, PTMG, PHEMG and PHPMG. These characteristics of polyethylene oxides can easily be understood and determined by one skilled in the art from the data of this Table. Regarding PPG, the decrease of the SP value with the increase of polymerization degree is sharp, as compared with the other polymers, due to the existence of the methyl group in the side chain.

TABLE 1

| Polymerization Degree | PEG | PPG | PTMG | PHEMG | PHPMG |
|---|---|---|---|---|---|
| 1 | 14.8 | 13.5 | 12.9 | 11.9 | 11.6 |
| 5 | 11.2 | 10.1 | 10.1 | 9.7 | 9.5 |
| 10 | 10.38 | 9.46 | 9.59 | 9.28 | 9.19 |
| 50 | 9.59 | 8.82 | 9.12 | 8.94 | 8.89 |
| 100 | 9.48 | 8.74 | 9.06 | 8.90 | 8.85 |
| 500 | 9.39 | 8.67 | 9.01 | 8.86 | 8.82 |
| Convergent Value | 9.37 | 8.65 | 8.99 | 8.86 | 8.82 |

In the segment polyurethanes of the present invention, the number of carbon atoms in the alkylene chain of $R_1, R_2, R_3 \ldots R_x$ in each segment is properly selected (or in other words, the kind of alkylene oxide in each segment is properly selected) while the molecular weight (polymerization degree) of each segment is properly regulated so that the segments which are nearer to one end of the polymer molecule have a larger hydrophilicity while those which are nearer to the opposite end of the polymer molecule have a larger hydrophobicity. Accordingly, in the segment polyurethanes of the present invention, the number of carbon atoms in the alkylene chain R in the segment at the hydrophilic end of the polymer molecule (or in the hydrophilic side of the polymer molecule) is the smallest. The number of carbon atoms in the alkylene chains in the remaining segments increases with the approach to the opposite and hydrophobic end of the polymer molecule, and the number of carbon atoms in the alkylene chain R of forming the segment at the hydrophobic end of the polymer molecule is the largest. Generally, the segments in the hydrophilic end of the polymer molecule are composed of alkylene oxides having an alkylene chain with 3 or fewer carbon atoms, such as hydrophilic PEG, PPG, etc., which have a high SP value as shown in Table 1, while the segments as bonded to the other end of the polymer molecule (in the hydrophobic side) are required to be composed of alkylene oxides having an alkylene chain with from 4 to 7 carbon atoms, such as hydrophobic PTMG, PHEMG, PHPMG, etc., which have a low SP value as shown in Table 1. This is because, if the segments as bonded to one end of the polymer molecule are composed of alkylene oxides having an alkylene chain with 4 or more carbon atoms, the whole polymer will become hydrophobic, or if the segments as bonded to the opposite end of the polymer molecule are composed of alkylene oxides having an alkylene chain with 3 or fewer carbon atoms, the whole polymer will become hydrophilic, and such polymers are not amphiphilic. Regarding PPG, as shown in Table 1, the hydrophobicity of PPG increases with the increase of molecular weight (polymerization degree) thereof and, therefore, if the hydrophilic segments of the polymer molecule are composed of the PPG, the molecular weight of the PPG is preferably restricted to about 750 or less. In addition, the difference of the number of carbon atoms in groups $R_1$ to $R_x$ in adjacent segments is preferably 3 or less. If the difference of the number of carbon atoms is 4 or more, the difference of the hydrophilicity or hydrophobicity between the adjacent segments increases undesirably, in addition, the synthesis of segment polymers having such a great difference is difficult. The present invention includes polymers in which adjacent segments have the same number of carbon atoms in their respective alkylene chains (i.e., have the same kind of alkylene oxides). Specifically, the number of carbon atoms in the alkylene chain forming each segment may be the same or larger than that in the alkylene chain forming the adjacent segment on the hydrophilic side of the polymer molecule. It will readily be apparent to one skilled in the art that even if the number of carbon atoms is the same in the alkylene chains in adjacent segments, the hydrophilicity or the hydrophobicity of the adjacent segments can be differentiated by properly varying the molecular weight (polymerization degree) of each segment, as mentioned above. Short segments each having an alkylene chain with the same carbon number can be bonded through urethane bonds, whereby the physical strength of the resulting polymers, including viscoelasticity, flexibility, toughness, etc., can be improved due to the urethane bonds. The molecular weight of each segment may readily be determined by one skilled in the art in consideration of not only the hydrophilicity or the hydrophobicity of the polymer molecules but also their solubility to solvents, their crystallinity and melting point, as well as their viscosity in a molten state.

Typical examples of ternary or quaternary-blocked amphiphilic segment polyurethanes containing different alkylene oxides are set forth below for reference. following formulae, (A), (B) and (C) each represents the isocyanate skeleton of a urethane bond, ied from the former to the latter, starting from one end of the polymer molecule, so that the hydrophilicity or the hydrophobicity of the polymer molecule is tapered throughout the whole polymer molecule, to achieve tapered hydrophilicity-hydrophobicity tapered struc-

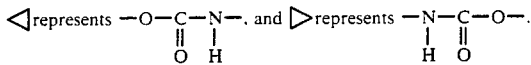

(1) XO⫹(PEG) ◁A ▷(PPG) ◁B ▷(PTMG)⫹X (2) XO⫹(PEG) ◁A ▷(PPG) ◁B ▷(PHEMG)⫹X (3) XO⫹(PEG) ◁A ▷(PTMG) ◁B ▷(PHEMG)⫹X (4) XO⫹(PEG) ◁A ▷(PTMG) ◁B ▷(PHPMG)⫹X (5) XO⫹(PPG) ◁A ▷(PTMG) ◁B ▷(PHEMG)⫹X (6) XO⫹(PPG) ◁A ▷(PTMG) ◁B ▷(PHPMG)⫹X (7) XO⫹(PPG) ◁A ▷(PHEMG) ◁B ▷(PHPMG)⫹X (8) XO⫹(PEG) ◁A ▷(PPG) ◁B ▷(PTMG) ◁C ▷(PHEMG)⫹X (9) XO⫹(PEG) ◁A ▷(PPG) ◁B ▷(PTMG) ◁C ▷(PHPMG)⫹X

(10) XO⫹(PEG) ◁A ▷(PPG) ◁B ▷(PHEMG) ◁C ▷(PHPMG)⫹X

(11) XO⫹(PEG) ◁A ▷(PTMG) ◁B ▷(PHEMG) ◁C ▷(PHPMG)⫹X

(12) XO⫹(PPG) ◁A ▷(PTMG) ◁B ▷(PHEMG) ◁C ▷(PHPMG)⫹X

(13) XO⫹(PEG) ◁A ▷(PPG) ◁B ▷(PTMG) ◁C ▷(PHEMG) ◁D ▷(PHPMG)⫹X

Each of the segment polyurethanes of formulae (5), (6), (7) and (12) has PPG as the hydrophilic segment at one end of the polymer molecule and, therefore, the molecular weight of the PPG is about 1,000 or less, preferably about 750, while the molecular weights of PHEMG and PHPMG are to be small, so that the hydrophilicity of the hydrophilic segments can properly be attained. The segment polyurethanes of formulae (11) and (12) each has PHEMG and PHPMG together with PTMG and, therefore, the molecular weights of the PHEMG and PHPMG are preferably small. In particular, polyurethane (12) has PPG as the hydrophilic segment, and the total length of the hydrophobic segments should be short relative to the length of the hydrophilic segment. Amphiphilic segment polyurethanes (1), (3) and (8) are preferred, since they can easily be synthesized and the polymer segments can easily be varied in a wide range.

The amphiphilic segment polyurethanes of the present invention are preferably at least ternary or greater multiblock copolymers, i.e., those containing at least three different kinds of alkylene oxide segments. This is because binary block copolymers or the like, which have only one hydrophilic segment and one hydrophobic segment each at the ends of the polymer molecule, cannot have hydrophilic component segments and hydrophobic component segments that are stepwise varied from the former to the latter, starting from one end of the polymer molecule, so that the hydrophilicity or the hydrophobicity of the polymer molecule is tapered throughout the whole polymer molecule, to achieve tapered hydrophilicity-hydrophobicity tapered structure according to the present invention.

Next, polyester segments in which the group ⫹S⫹ is a lipophilic segment will be described hereinafter. In polyester glycols of the present invention, lipophilicity can advantageously be varied on the basis of the number of methylene groups in the segments relative to hydrophobicity as based on the number of methylene groups in the alkylene oxide segments, to obtain close control of the hydrophilicity-hydrophobicity-lipophilicity tapered structure of the segment polyurethanes of the present invention. For this purpose, the fatty acid polyesters of (II) and (III) may be used. Aliphatic polyesters as represented by formula (II) may be the reaction product of aliphatic dicarboxylic acids and glycols. Low molecular weight aliphatic polyesters are brittle and waxy, while high molecular weight polyesters are tough and keratinous. Waxy polyesters having a low molecular weight are preferably used in the present invention. The melting point of waxy polyesters increases with the increase of the molecular weight, and those having a relatively low molecular weight have an almost constant melting point. The melting point is an intrinsic value in each polyester comprising a dicarboxylic acid and a dihydric alcohol. The polyesters for use in the present invention are roughly restricted to those having a molecular weight of from about 500 to 3,000 or so. In general, polyesters having side chains which may increase the intramolecular distance and reduce the symmetry of the molecule have a low melting point, and most of them are liquid. Such liquid polymers can easily be used in the present invention, provided that they are selected to provide the required balance of the hydrophilicity-hydrophobicity-lipophilicity in the total polymer, as well as any desired melting temperature and viscosity characteristics or other chemical characteristics, such as an affinity with low molecular compounds.

Specific examples of aliphatic dicarboxylic acids and glycols used to produce the aliphatic polyesters of the present invention are as follows, although the present invention is not limited to these illustrative examples. Typical glycols include $HOR_yOH$, where $R_y$ represents $-(CH_2)_2-$, $-CH(CH_3)CH_2-$, $-CH(CH_3)(CH_2)_2-$, $-(CH_2)_4-$, $-(CH_2)_5-$, $-(CH_2)_6-$, $-(CH_2)_{20}-$, $-(CH_2)_2-O-(CH_2)_2-$,

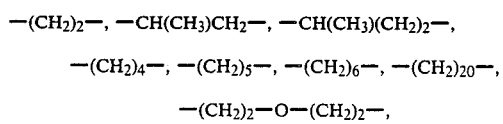

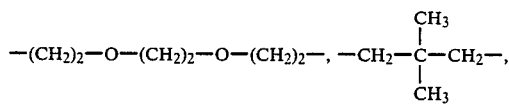

carboxylic acids include $HOOC(CH_2)_nCOOH$ where n is an integer from 2 to 8, as described, for example, in V. V. Korshak et al., *Zh. Obshch. Khim.*, 26,539 (1956).

Among the polyesters formed by the combination of these glycols and dicarboxylic acids, those having a relatively low molecular weight (about 500 to 3,000) are suitably used in the present invention, provided that the number of methylene groups in this segment is at least 5, because the polyester segment must be more hydrophobic than the adjacent polytetramethylene glycol segment. Although the difference between the ester bond of the polyester and the ether bond of the polyether would be expected to have some influence on the hydrophilicity or hydrophobicity of the polymers, the present inventors have confirmed that the ester bond has a strong intermolecular cohesive force in a solid stage and that the polyesters have a stronger affinity with lipophilic solvents than the polyethers. In addition, polyesters, even those having a low molecular weight, are solid, hard and waxy because of the intermolecular force caused by the ester bond therein, but, when melted, these change to a liquid having a low viscosity. Accordingly, by using such polyester segments, polymers can be obtained having a definite melting point and a definite viscosity variation. Polymers of this kind differ from the other amphiphilic segment polyurethanes containing only polyalkylene oxides with from 5 to 7 carbon atoms as the lipophilic segments, since polyester segment polymers are harder in a solid state and have a more definite apparent melting point (Tm) and a low viscosity in the liquid phase than the latter polymers. In addition, the use of the polyester segments of this kind has the advantage that many kinds of polyester can be used, including liquid polyesters, to provide various segment polyurethanes individually having a different lipophilicity-hydrophobicity-hydrophilicity balance.

In the same manner, the ring-cleaved polymers obtained from cyclic esters, which are represented by the formula (III), can be used. The ring-cleaved polymers preferably have a molecular weight of about 200 to 3,000, more preferably about 500 to 2,000, and can be synthesized in accordance with the method described, for example, in Union Carbide Co., British Patent No. 981,199 (1965). Specific cyclic esters include, for example, β-lactones of

γ-lactones of

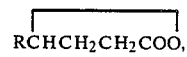

δ-lactones of

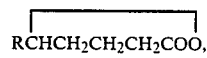

and macrocyclic lactones of

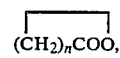

wherein R represents an alkyl group having from 1 to 18 carbon atoms, generally a methyl group, and n represents an integer of from 8 to 16. Polyester glycols that are the reaction product of a ring-cleaved polymer of ε-caprolactone and ethylene glycol are easily obtained and those having a molecular weight of from about 500 to 2,000 are advantageously used in the present invention. In addition, poly-β-methyl-δ-valerolactone glycol, having a molecular weight of from about 1,000 up to 3,000, can be used as a liquid polyester having a low viscosity.

In general, polyalkylene oxides are synthesized by ring cleavage polymerization of cyclic ether compounds, and have an increased hydrophilicity with the decrease in the number of methylene groups which they contain, since the proportion of the ether oxygens becomes larger. They become more hydrophobic with an increase in the number of methylene groups in the alkylene oxides, since the proportion of the ether oxygen therein is smaller. For the reasons indicated above, alkylene oxides having more methylene groups are hydrophobic.

With respect to hydrophobicity and the influence of molecular weight, the aliphatic polyesters containing a chain of methylene groups generally behave similarly to the ethers and esters described above despite some differences. The ether type polymer is superior in hydrolytic properties as compared with the polyesters, but is inferior in ultraviolet resistance than the ester type polymer. Further, the ester type polymer is harder than the ether type polymer in a solid state, because of a intermolecular cohesive force, whereas the ether type polymer is a soft and waxy polymer. Therefore, these types of polymers can be selected according to the various purposes.

The alkylene oxide polymers for use in the present invention preferably have a low polymerization degree, since these are constitutional elements for the formation of segments of the segment polyurethanes of the present invention. In addition, these may suitably be selected in consideration of the desired balance of hydrophilicity-hydrophobicity-lipophilicity, melting point, and viscosity of the resulting polymer and any desired affinity with low molecular compounds. Depending on these factors, the molecular weight of the segments is generally about 500 to 3,000. When the molecular weight is extremely increased, the proportion of the terminal groups is remarkably reduced, whereby the segmented polyurethane is hardly obtained by the urethane bond of the terminal groups, and as a result, the yield is remarkably decreased. Further, in the case of such a high molecular weight, since the distribution of the molecular weight becomes too much broad ranges, the complete polymer of a uniform segment length cannot be obtained.

As the isocyanate compounds (A), (B) and (C) and (u) in the segment polyurethanes of the present invention, various diisocyanates can be used, including, for example, p-phenylene diisocyanate (SP value: 12.84), 2,4-toluylene diisocyanate TDI (SP value: 12.77), 4,4'-diphenylmethane diisocyanate MDI (SP value: 12.54), naphthalene-1,5 diisocyanate (SP value: 13.29), hexamethylene diisocyanate (SP value: 11.14), lysine diisocyanate (SP value: 11.76), xylylene diisocyanate (SP value: 12.35), hydrogenated TDI (SP value: 11.19), hydrogenated MDI (SP value: 11.37), dicyclohexyldimethylmethane p,p'-diisocyanate (SP value: 10.55), diethyl fumarate diisocyanate (SP value: 12.11), isophorone diisocyanate (SP value: 11.41). It is preferable to use diisocyanates having a mean SP value that approximately equals the SP values of both adjacent alkylene oxide segments, to improve the tapered hydrophilicity-hydrophobicity structure of the resulting segment polyurethanes.

In the segment polyurethanes of the present invention, the terminal group —OX' is —OH, —OCl, —OBr or —OF in the hydrophilic segment side, while the group —OX is

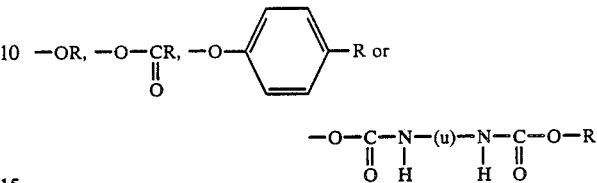

(in which R represents an alkyl group having from 1 to 18 carbon atoms or a vinyl group; (u) represents an isocyanate compound skeleton as described above) in the hydrophobic segment side. The SP value of (u) in the terminal group —OX is comparatively low value, preferably about 12 to 9, because it is in the hydrophobic segment side. As the isocyanate compound (u), isophorone diisocyanate is preferably used.

The amphiphilic segment polyurethanes of the present invention can be dimerized, if desired, by binding the hydrophilic segments of the two polymers, each being at one end of the polymer molecule, or binding the hydrophobic segments of the two polymers, each being at the opposite end of the polymer molecule, to form a dimer having a tapered hydrophobicity-hydrophilicity-hydrophobicity or hydrophilicity-hydrophobicity-hydrophilicity structure. The following Table 2 shows some typical examples of combinations of segments according to the present invention, although the present invention is not to be construed as limited in any way by these specific examples. Following Table 2, a systematic flow chart for the synthesis of the polymers of the present invention is given.

TABLE 2

| | Example No. | | | | | | | |
|---|---|---|---|---|---|---|---|---|
| | 1 | 2 | 3 | 4 | 5 | 6 | 7 | 8 |
| Segment | Mw | Mw | Mw | Mw | Mw | Mw | Mw | Mw |
| PAO (I) | 500*1 | 1,000*1 | | | | | | |
| PES (II) | | | | | | | 1,000*3 | 800*4 |
| PES (III) | | | | | | 530*2 | | |
| PTMG | 2,000 | | 2,000 | 1,000 | 650 | | | 650 |
| PPG | 1,000 | 1,000 | 2,000 | 1,000 | 400 | 400 | 400 | 400 |
| PEG | 800 | 1,000 | 1,000 × 3*5 | 1,000 | 1,000 | 1,000 | 1,000 | 1,000 |
| Total Mw | 4,900 | 3,400 | 7,500 | 3,400 | 2,450 | 2,330 | 2,800 | 3,400 |

PAO: Polyalkylene oxide.
PES: Polyester.
PTMG: Polytetramethylene glycol.
PPG: Polypropylene glycol.
PEG: Polyethylene glycol
*1 Polyhexamethylene glycol.
*2 Poyl-ε-caprolactone.
*3 Poly-3-methylpentane-1,5-diol-adipate.
*4 Polybutylene adipate.
*5 Three PEG-1000's are linked together
Isocyanate: Hexamethylene diisocyanate
The hydrophobic end is blocked with butyl isocyanate; and the hydrophilic end is —OH.

TABLE 2-continued

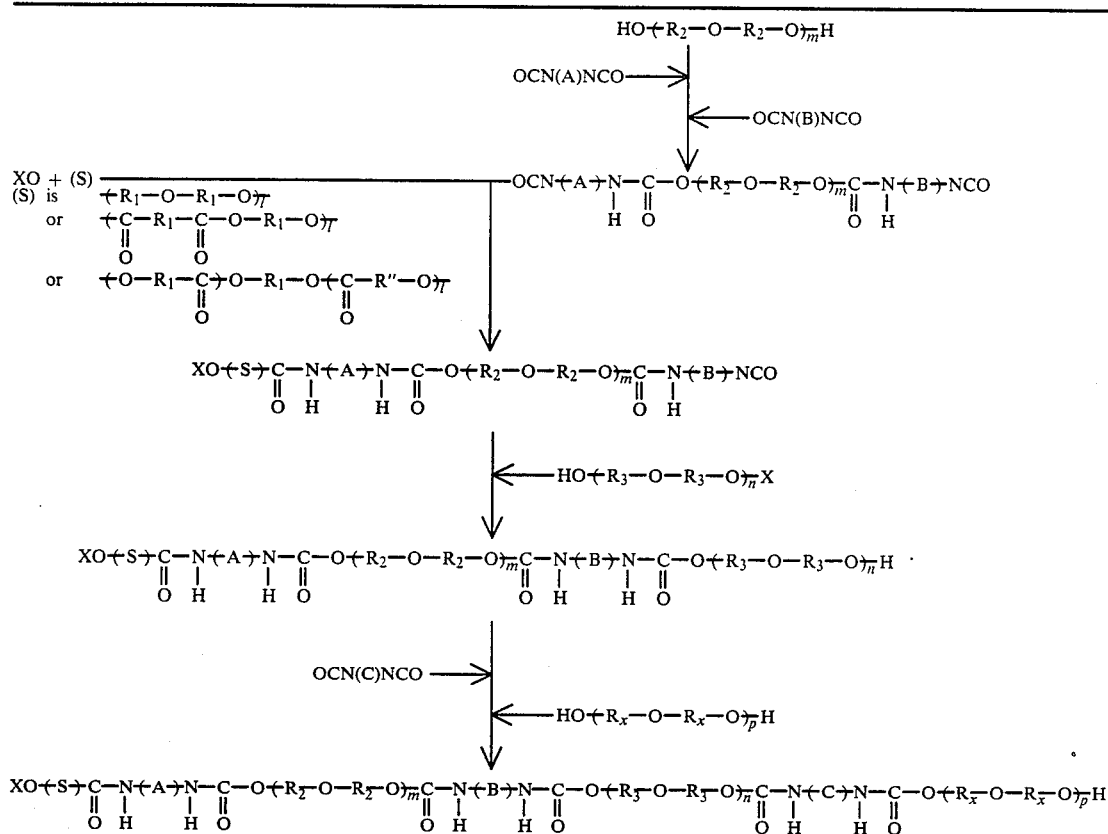

(The catalyst is n-butyl-tin dilaurate.
The urethanation reaction is carried out in benzene for 3 hours at 50° C.)

The effect of the present invention will be explained in detail hereinafter.

The amphiphilic segment polyurethanes of the present invention having a urethane bond between alkylene oxide segments generally have increased strength in comparison with homopolymers of alkylene oxides or block copolymers in which alkylene oxides are directly linked with one another. For instance, homopolymers of alkylene oxides generally become a white, waxy and brittle solid with increasing polymerization degree up to the limit at which they are useful as segments. The segment polyurethanes of the present invention may be transparent elastomers in accordance with the balance of the crystallinity and the non-crystallinity of the segment polymers, as the viscoelastic strength is intensified in accordance with type or number of urethane bonds existing between the segments. Accordingly, the segment polyurethanes of the present invention can be shaped into products of various forms, including filmy, sheet-like, rod-like or other shaped articles. This is one characteristic aspect of the present segment polyurethanes that is not found in any other homopolymers or copolymers of alkylene oxides. In block copolymers of alkylene oxides, the adjacent segments interfere with each other, a result that undesirably affects the delicate balance in the hydrophilicity or hydrophobicity of each segment. While in the segment polyurethanes of the present invention, the polymerization effect on the intramolecular segments and the intermolecular interaction might be expected to disrupt the crystallinity of the polymers or to lower the softening point thereof, the urethane bond between segments beneficially reduce the mutual interference of the segments. Accordingly, the segment polyurethanes of the present invention permit effective use of the difference of hydrophilicity or hydrophobicity in each segment, which is so constituted that the hydrophilicity-hydrophobicity is tapered from one end of the polymer molecule. Typical applications of the polymers of the present invention are now provided, which will make clear the surprising benefits and effects of the amphiphilic segment polyurethanes of the present invention, and will readily suggest other uses to one skilled in the art.

A most important use of the segment polyurethanes of the present invention is in applications which permit utilization of the remarkable specificity of the polymer segment-small molecular compound interaction. The specific behavior of the molecular aggregate can be advantageously employed, for example, as a base component capable of gradually releasing a drug.

The segment polyurethanes of the present invention are amphiphilic polymers where the hydrophilicity-hydrophobicity of each segment is stepwise tapered from one end of the polymer molecule to the other, and the ends of the polymer are relatively hydrophilic and hydrophobic. Accordingly, when a drug is dissolved in such a segment polyurethane, the drug dissolved is weakly bonded and held at the ether-oxygen position of each segment of the polymer because of the hydrogen bond, Van der Waals force or the like therebetween. If the drug is hydrophilic, it is transferred in order to the segments in the hydrophilic side having increasing hydrophilicity and then is gradually released from the end of the hydrophilic side of the polymer. If the drug is hydrophobic, it is transferred in order to the segments in the hydrophobic side having increasing hydrophobicity and then is gradually released from the end of the hydrophobic side of the polymer. Such an effect can be attained efficiently only by the use of the segment polyurethanes of the present invention, made up of linked alkylene oxide segments which have a hydrophilicity-hydrophobicity tapered structure. This point will be explained in more detail hereinafter.

In general, low molecular compounds (except hydrocarbons which have no polar group) have both polar groups and non-polar groups, and these groups are well balanced in the molecular structure of the compounds, as is generally true of the molecular structure of drugs. In drug preparations in which a drug is incorporated into a polymer as a base component, it is desired, to enhance the release efficiency of the drug from the composition, that the drug has a relatively weak affinity with the polymer of the base component and that the drug be uniformly dispersed in the base, while still having a high activity coefficient. The release control of the drug from such drug compositions is influenced by the binding force between the drug and the base polymer, i.e., the weak intermolecular interaction therebetween, as well as by the state of the dispersion on a molecular level and the thermal and physicochemical behaviors of the polymer and the drug.

Specifically, when the bond between the drug and the polymer is too strong, e.g., if the bond is a coordination bond, covalent bond, ionic bond or similar strong bond, the drug would be chemically changed by the reaction with the polymer, and the drug cannot have a high activity coefficient. However, if the two are bonded by a hydrogen bond (bond energy: several Kcal/mol), a Van der Waals force (bond energy: 1 Kcal/mol or less) or a similar weak bond, the drug scarcely reacts with the polymer and the drug still may have a free and high activation degree. Alkylene oxides have ether-oxygens, and it is well known that these oxygens can form a hydrogen bond with an active hydrogen of alkylcarboxylic acids (e.g., olefinic acid, etc.) or higher alcohols, which are polar group-containing hydrocarbons, so that the alkylene oxides can solubilize these hydrocarbons, and in the case of drugs, that a weak bond is formed between the alkylene oxides and the drugs.

The hydrophobicity of alkylene oxides varies depending upon the number of methylene groups therein (or the number of carbon atoms of the alkylene groups therein). Although the hydrophobic effect is not so noticeable in the monomer units, it becomes remarkable when the monomer units are linked to form a linear polymer segment. Accordingly, the segment polyurethanes of the present invention, containing different alkylene oxide segments linked by a urethane bond such that the number of methylene groups (or carbon atoms of alkylene group) increases or decreases in stepwise fashion, have a smooth hydrophilicity-hydrophobicity tapered structure. For this reason, when a drug is dispersed in the polymer in an amount sufficient to saturate the ether oxygens of the alkylene oxide segments to form a weak bond between the oxygen and the drug in the form of a molecular dispersion, the concentration of the dispersed state of the drug is distributed in accordance with the tapered structure of the segments. When the drug to be dispersed is a strongly lipophilic one, the methylene chains in the segment polyurethanes conveniently interact with the drug to form an effective molecular dispersion, and the concentration of the molecular dispersion state of the drug will be tapered to form a concentration gradient. Thus, the smoothly tapered gradient of hydrophilicity-hydrophobicity in the segment polyurethanes furnishes a position having the highest affinity with a drug of a highest concentration near the segment which corresponds to the solubility constant of the drug and, therefore, some segment of the polymer corresponds to the lipophilicity or the hydrophilicity of any drug. Specifically, the segment polyurethanes of the present invention always have an opened molecular structure, permitting any lipophilic drug to move from the side of the lipophilic segment of the polymer and any hydrophilic durg to move from the side of its hydrophilic segment.

In the polymers of the present invention, each segment is separated by a urethane bond and each separated segment retains its original thermal movement behavior determined by the molecular bond force, molecular weight and intermolecular force thereof. Accordingly, the movement of a drug present near a segment having an active thermal movement at a certain temperature can be initiated. The melting temperature of the total polymer is determined by the interaction between the segments, and the temperature also depends upon the thermal movement of each segment.

In accordance with the intermolecular interaction as mentioned above, drugs of various kinds incorporated in the polymer base can be released from the polymer composition according to a specifically controlled release pattern.

In addition, heat-sensitive polymers which melt at a determined temperature can be obtained by appropriately regulating the sequence of the hydrophilic or hydrophobic segments and the molecular weight thereof; and water-sensitive polymers can also be obtained by appropriately regulating the proportion of the ether oxygens and the proportion of the hydrophilic segments. When a drug is dissolved in such a polymer, it will melt at the determined temperature. When contacted with water, it can form microspheres due to the interfacial energy, and be self-emulsified in the direction of the aqueous phase, and upon contact with an oily component, the microspheres will be broken and the drug dissolved therein can be released.

The segment polyurethanes of the present invention can also be used as a separation membrane. The segment polyurethanes of the present invention, having a high viscoelasticity strength, can easily be filmed. Each constitutional segment has a different solubility to solvents, since the polymers have a hydrophilicity-hydrophobicity tapered structure in which each constitutional segment is stepwise varied from hydrophilic to hydrophobic from one end of the polymer molecule to the other. Accordingly, a solvent can be dispersed around the segment having the highest affinity with the solvent in the form of a molecular dispersion, whereby the segment part is dissolved in the solvent to form a liquid phase for selective permeation. Specifically, the separation utilizes the difference in the solubility but not the difference of diffusibility. Accordingly, even a mixture of water and a lower alcohol, the separation of which is difficult, can be separated into the individual components, provided that the hydrophilicity or the hydrophobicity of each segment is carefully regulated so that either one of the respective components can selectively penetrate through the polymer membrane. In this case, when a lower alcohol such as ethanol is to be selectively penetrated therethrough, the polymer is required to have a PTMG segment (molecular weight: about 800 to 3,000) having a high affinity for the alcohol. However, if the polymer has only one PTMG segment in one molecule, efficient separation cannot be expected and, therefore, it is desired to link plural PTMG segments via a urethane bond so as to elevate the proportion of the PTMG content in the polymer molecule, or to appropriately incorporate one or more PEG chains therein, to improve the separation efficiency of the polymer membrane. In the case of separation, swelling of the membrane reduces separation efficiency. To reduce swelling, trifunctional isocyanates or the like can be introduced into the polymer to form a network structure that reduces the swelling of the membrane as much as possible.

The amphiphilic segment polyurethanes of the present invention also can be utilized as ionic conductors. For instance, when a metal salt is added to the segment polyurethane, the metal salt can form a complex in the position of the ether oxygen in each segment, in which ionic conductivity is limited in the hydrophobic segment (i.e., the segment having an alkylene chain with 4 or more carbon atoms) due to the large distance between the ether oxygens and separation of the metal salts bonded thereto, while ionic conductivity is good in the hydrophilic segment (i.e., the segment having an alkylene chain with 3 or fewer carbon atoms) since the distance is short therein. Accordingly, the polymer is put in water to form micelles having hydrophilic segments such as PEG, PPG, etc., in their outer regions, LiClO$_4$ or NaI is applied to these outward-facing hydrophilic segments to form the metal complexes, and the resulting polymer complex is filmed to obtain an ionic conductor. In this case, the hydrophobic segments in the polymer which do not form any metal complexes act as a shape-retentive skeleton. The adjustment of the melting point of the polymer by adjusting the molecular weight of each segment is effective for proper control of the strength of the ionic conductivity of the ionic conductor on the basis of the boundary of the thus-adjusted melting point.

Further, the amphiphilic segment polyurethanes of the present invention can be utilized as a liquid membrane. In general, a liquid membrane is a composite membrane in which a surfactant reacts on the homogeneous film in a liquid state. The molecule of the surfactant aggregates in the interface when applied to the liquid membrane, the hydrophilic part of the molecule facing the solution side and the hydrophobic part the homogeneous film side. When a salt solution is used as a feeding solution in reverse osmosis and a polyvinylmethyl ether is added thereto as a surfactant, the degree of salt permeation depends upon the hydrophilicity-hydrophobicity ratio of the surfactant molecule forming the liquid membrane. Surfactants providing a large salt removal percentage include polyoxyethylene nonylphenol, polyvinyloctadecyl ether. Of the segment polyurethanes of the present invention, those comprising segments of high hydrophilicity and segments of high hydrophobicity can effect a large salt removal percentage. Also, polymers of the present invention having PPG segments in the polymer molecule are difficult to crystallize because of the methyl side chain in the PPG segment. Accordingly, when these polymers contain internal liquid PPG segments, although they are solid in the complete form, they can be used as a liquid membrane containing oily emulsion spheres that does not require any support, based on the solvent characteristics of the liquid PPG segments.

Furthermore, the amphiphilic segment polyurethanes of the present invention, as being amphiphilic polymers having a hydrophilicity-hydrophobicity structure tapered in order from one end of the polymer molecule to the opposite end of the polymer molecule, have a higher emulsification power than low molecular surfactants and can form a stable emulsion. In addition, the present polymers have excellent dispersibility and solubilization, and are practically non-toxic and extremely non-irritant to skins. Accordingly, the polymers of the present invention can be used advantageously as core-shell type composite emulsions, for example, as emulsions for medical use or inspection (e.g., for protein adsorbents, etc.). Further, the polymers of the present invention, having a large solubilizing ability, can be used as a solubilizer for agricultural chemicals, perfumes, cosmetics.

The following examples are intended to illustrate particular embodiments of the present invention but are not to be construed as limiting its scope in any way.

EXAMPLE 1

A benzene solution (20 w/v %) of 1 mol of tetramethylene glycol (average molecular weight: 2,000) was reacted with a benzene solution (20 w/v %) of 2 mols of xylylene diisocyanate at 50° to 55° C. for 3 hours. Next, a benzene solution (20 w/v %) of a product obtained by reacting 1 mol of hexamethylene glycol (average molecular weight: 1,000) and 1.05 mols of n-butylisocyanate at 60° to 70° C. for 3 hours was added to the resulting reaction product, and further reacted at 50° to 55° C. for 3 hours. To the reaction product obtained was added a benzene solution (20 w/v %) of 1 mol of 4,4'-diphenylmethane diisocyanate and 1 mol of polypropylene glycol (average molecular weight: 1,000), and this solution was further reacted at 50° to 55° C. for 3 hours. A benzene solution (20 w/v %) of 1 mol of polyethylene glycol (average molecular weight: 1,000) was added to the last reaction product and further reacted at 50° to 55° C. for 3 hours. In this reaction, the benzene used was completely dehydrated by a distillation prior to use. Further, 0.01 g of dibutyl-tin dilaurate was added as a catalyst. The thus-obtained reaction product was lyophilized to remove benzene, and whereby the desired polymer having the following structural formula was obtained.

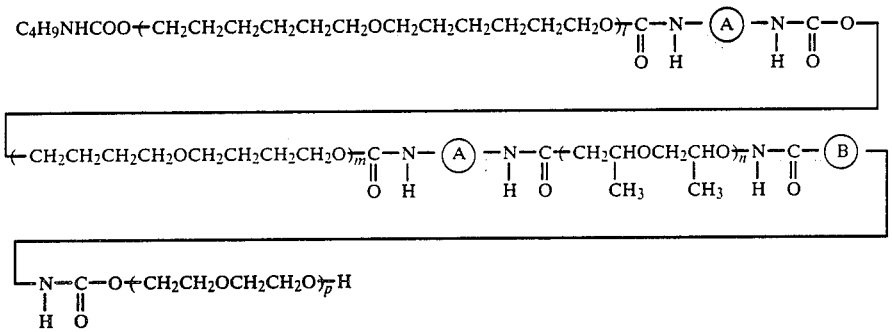

wherein the polyhexamethylene glycol segment has an average molecular weight of 1,000; the polytetramethylene glycol segment has an average molecular weight of 2,000; the polypropylene glycol segment has an average molecular weight of 1,000; the polyethylene glycol segment has an average molecular weight of 1,000; (A) represents a skeleton of xylylene diisocyanate; and (B) represents a skeleton of 4,4'-diphenylmethane diisocyanate.

The thus-obtained polymer was isolated and purified by a preparative GPC column (ASAHIBAG GS-310P manufactured by Asahi Kasei Kogyo Kabushiki Kaisha) to remove any impurities and unreacted products. The average molecular weight of the amphiphilic quaternary block segment polyurethane thus obtained was 6,300, Mw/Mn being 1.2. The polymer was blocked with a butyl group in the side of the polyhexamethylene glycol and had a hydroxyl group in the side of the polyethylene glycol. The melting point was 36.5° C., as visually measured.

To 100 g of this polymer was added 0.5 mg of undecylenic acid (m.p. 24.5° C., insoluble in water, soluble in ethanol) each in a molten state at 40° C., and the mixture was uniformly dissolved. The resulting solution was coated on a polyethylene film base in an amount of 500 mg to form a coat thereon having a thickness of 200 μm, and the surface of the polymer coat was applied to a human/rat skin whereby the migration and absorption of the undecylenic acid was observed with the lapse of time. Initially the acid was released somewhat rapidly, and afterwards, the acid was gradually released with a zero-order release control. After 50 hours, the release percentage reached a peak value of from 65 to 75%.

The above result demonstrates that the molecular dispersion attained by the weak hydrogen bond between the ether oxygen in the alkylene oxide segment and the fatty acid and the smooth tapered hydrophilicity-hydrophobicity structure in the polymer molecule are effective in controlling release of the fatty acid from the polymer. From this example it will be clear to one skilled in the art that the polymers according to the present invention are capable of wide application in the controlled and sustained release of drugs or other biologically active agents.

EXAMPLE 2

A benzene solution (20 w/v %) of 1 mol of polypropylene glycol (average molecular weight: 1,000) was reacted with a benzene solution (20 w/v %) of 2 mols of hexamethylene diisocyanate at 50° to 55° C. for 3 hours. Next, a benzene solution (20 w/v %) of a product obtained by reacting 1 mol of a ring-cleaved polymer (average molecular weight: 1,000) of β-methyl-δ-valerolactone with ethylene glycol and 1.05 mols of n-butylisocyanate at 60° to 70° C. for 3 hours was added to the resulting reaction product, and further reacted at 50° to 55° C. for 3 hours. To the reaction product obtained was added a benzene solution (20 w/v %) of 1 mol of polyethylene glycol (average molecular weight: 1,000), and this solution was further reacted at 50° to 55° C. for 3 hours. Thereafter, the reaction product obtained was lyophilized to obtain the desired polymer having the following structural formula.

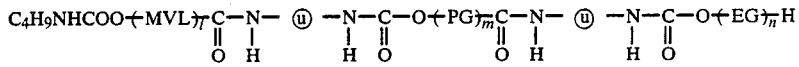

wherein the ring-cleaved polymer segment of β-methyl-δ-valerolactone and ethylene glycol has an average molecular weight of 1,000; the polypropylene glycol segment has an average molecular weight of 1,000; the polyethylene glycol has an average molecular weight of 1,000; and ⓤ a skeleton of hexamethylene diisocyanate.

The polymer obtained was isolated and purified using a preparative GPC column to remove any impurities and unreacted products. The average molecular weight of the amphiphilic ternary block segment polyurethane thus obtained was 3,600, Mw/Mn being 1.3, and the melting point thereof was 36.4° C. by DSC measurement.

After 50 g of the polymer was dissolved in 50 ml of ethanol, lithium perchlorate $LiClO_4$ was uniformly dissolved therein in an amount of 1 mol per 6 to 20 ether-oxygens in the alkylene oxides of the polymer. Next, the ethanol was completely evaporated out in vacuum, and thus, a polymer/ion complex which was solid at normal temperature was obtained. This had a conductivity of $10^7$ ω in a solid state and of $10^5$ ω in a liquid state at about 40° C. or higher.

In the same manner, polymer/ion complexes having NaI, KCl, $CuCl_2$, $FeCl_3$, NaSCN as a metal salt were formed, and the conductivity of each complex was investigated. The complexes generally had a conductivity of $10^7$ ω or more in a solid state, $10^5$ to $10^7$ ω in a pasty state at about 30° to 40° C. and $10^3$ to $10^5$ ω in a molten state at 40° C. or higher. These polymer/ion complexes are suitable for use as an ionic conductor for temperature sensors.

20 g of the present polymer was melted and dispersed in 100 ml of water to form core-shell type microspheres (average diameter: 100 μm) therein, and only the out-side hydrophilic segments (PPG, PEG) were formed into ion-complexes. The resulting microspheres were melted at about 50° C. and shaped to obtain an ion-conductor having a different morphology, having a specific conductivity, in accordance with the test method described in JIS K-6911, paragraph 5-13 (JIS:Japanese Industrial Standards).

EXAMPLE 3

A benzene solution (20 w/v %) of 1 mol of polypropylene glycol (average molecular weight: 400) was reacted with a benzene solution (20 w/v %) of 2 mols of isophorone diisocyanate at 50° to 55° C. for 3 hours. Next, a benzene solution (20 w/v %) of a product obtained by reacting a polyester polyol (average molecular weight: 580) of 1 mol of 3-methylpentane-1,5-diol and an adipic acid, and 1.05 mols of n-butylisocyanate at 60° to 70° C. for 3 hours was added to the resulting reaction product, and further reacted at 50° to 55° C. for 3 hours. To the reaction product obtained was added a benzene solution (20 w/v %) of 1 mol of polyethylene glycol (average molecular weight: 1,000), and this solution was further reacted at 50° to 55° C. for 3 hours. The reaction product obtained was lyophilized to obtain the desired polymer having the following structural formula.

$$C_4H_9NHCOO\text{-}(MPA)_\overline{\tau}C\text{-}N\text{-} \text{①} \text{-}N\text{-}C\text{-}O\text{-}(PG)_{\overline{m}}C\text{-}N\text{-} \text{①} \text{-}N\text{-}C\text{-}O\text{-}(EG)_{\overline{\tau}}H$$
$$\phantom{C_4H_9NHCOO\text{-}(MPA)_\overline{\tau}}\overset{\|}{O}\ \overset{|}{H}\phantom{\text{-} \text{①} \text{-}}\overset{|}{H}\ \overset{\|}{O}\phantom{\text{-}(PG)_{\overline{m}}}\overset{\|}{O}\ \overset{|}{H}\phantom{\text{-} \text{①} \text{-}}\overset{|}{H}\ \overset{\|}{O}$$

wherein MPA segment has an average molecular weight of 580; PG segment has an average molecular weight of 400; EG segment has an average molecular weight of 1,000; and ① represents isophorone diisocyanate.

The polymer obtained was isolated and purified using a preparative GPC column to remove any impurities and unreacted products. The average molecular weight of the amphiphilic ternary block segment polyurethane thus obtained was 2,580, Mw/Mn being 1.2, and the melting point thereof was 30° C., as visually measured. Although the polyurethane contained polyethylene glycol as a hydrophilic segment having an affinity with water, it was insoluble in water at a temperature lower than 30° C. However, it melted at 30° C. or higher, and when contacted with water in the liquid state, formed microspherical oil drops because of the effect of the interfacial energy with water and was vigorously self-emulsified into the aqueous phase side. Accordingly, the segment polyurethane formed herein had both heat sensitivity and water sensitivity.

The segment polyurethane was melted and naphthalenyl-methyl carbamate-formalin (trade name: SEVIN), which is an agricultural chemical, was dissolved therein in an amount of 1% (by weight, unless otherwise indicated, all percentages are weight percents) on the basis of the polyurethane. This agricultural chemical has a pharmaceutical activity against leafhoppers, rice insects, leaf holders and plant lice, and is almost insoluble in water, having a water solubility of only 0.1%. Its vapor pressure at 25° C. is $4 \times 10^{-5}$ mm Hg, and it is a powder having a melting point of 142° C. This agricultural chemical was well dissolved in the liquidified segment polyurethane because of the solubilizing effect of the segments. To the resulting drug-containing polymer solution, a fine powder of aluminum hydroxide was added as a neutral inorganic filler in an amount of 80% and blended, to obtain a powdery agricultural drug-containing preparation.

The resulting agricultural drug preparation was sprayed in vitro and the sustained releasability thereof was tested. Practically no release of the drug component was observed when this was dry or brought into contact with water at 30° C. or lower. However, when about 5 ml of water was sprayed over 1 g of the preparation as heated at 30° C. or higher, whereupon the polymer component therein was melted, the preparation formed microspheres to become oily drops (average diameter: 30 μm), which were self-emulsified from the surface of the powder into the aqueous phase. The microspherical oily drops were applied to the leaves and stems of plants. When these were brought into contact with the skins of the above-mentioned harmful insects, the microspheres were broken because of the hydrophobicity of the insect skins, whereby the drug component dissolved was gradually released to penetrate and be absorbed into the bodies of the insects to kill them. In this case, the sustained release of the agricultural drug component is properly controlled because of the tapered hydrophilicity-hydrophobicity structure of the segments in the segment polyurethane.

Agricultural drug preparations of this type act to release the drug component therefrom in the rainy season or summer season, having an environmental temperature of higher than 30° C., only when it rains or when water is sprinkled over plants. Thus, the drug is effectively released only in a high temperature and high moisture season when harmful insects are present and, therefore, this preparation is free from any environmental pollution caused by wasteful drug-release in an inappropriate season, and, further, it is almost harmless to humans. Specifically, the agricultural drug preparation of this type is a sustained release preparation which can release the drug component only in certain environmental conditions and which has a specific release time selectivity.

EXAMPLE 4

A benzene solution (20 w/v %) of 1 mol of polytetramethylene glycol (average molecular weight: 1,000) was reacted with a benzene solution (20 w/v %) of 2 mols of xylylene diisocyanate at 50° to 55° C. for 3 hours. Next, a benzene solution (20 w/v %) of 2 mols of polytetramethylene glycol (average molecular weight: 1,000) was added to the resulting reaction product, and further reacted for 3 hours under the above same conditions. Further, the reaction product obtained was added to a benzene solution (20 w/v %) of 2 mols of 4,4'-diphenylmethane diisocyanate, and then reacted for 3 hours under the same conditions. To the reaction product obtained was added a benzene solution (20 w/v %) of 2 mols of polypropylene glycol (average molecular weight: 1,000), and this solution was further reacted for 3 hours under the same conditions. The resulting reaction product was added to a benzene solution (20 w/v %) of 2 mols of hexamethylene diisocyanate, and further reacted for 3 hours under the same conditions. Then, a benzene solution (20 w/v %) of 2 mols of polyethylene glycol (average molecular weight: 2,000) was added to the last reaction product, and further reacted for 3 hours under the same conditions. The thus-obtained reaction product was lyophilized to remove benzene as a solvent, whereby the desired polymer having the following structural formula was obtained.

wherein EG segment has an average molecular weight of 2,000; PG regment has an average molecular weight of 1,000; TMG segment has an average molecular weight of 1,000; -ⓤ represents xylylene diisocyanate; ⓤ ' represents 4,4'-diphenylmethane diisocyanate; and ⓤ " represents hexamethylene diisocyanate.

The thus-obtained polymer was isolated and purified using a preparative GPC column to remove any impurities and unreacted products. The average molecular weight of the amphiphilic heptanary block segment polyurethane thus obtained was 10,200 Mw/Mn being 1.35, and the melting point thereof was 46.5° C., as visually measured. 20 g of the segment polyurethane having a hydroxy group at both ends thereof was diluted with 80 ml of ethyl acetate, and then cross-linked with 2 ml of the three-addition product (D-110N manufactured by Asahi Kasei Kogyo Kabushiki Kaisha) of trimethylolpropane and xylylene diisocyanate. Then, the solvent was removed and a film having a thickness of 45 μm was produced.

The thus-obtained film was fitted in a filter holder and then contacted with a 1:1 solution of water and ethanol from the top thereof at a pressure of 760 mm Hg. The liquid component passed through the film (membrane) was ethanol in the proportion of 95% or more, demonstrating the suitability of polyurethanes according to the invention as membranes for selective permeation.

EXAMPLE 5

19 amphiphilic segment polyurethanes each having the segment structure as shown in the following Table 3 were synthesized in the similar manner, and the melting point of each polymer was measured by a differential thermal analysis. The results are given in Table 3.

TABLE 3

| Segments | Molecular Weight | M.P. DSC (°C.) |
|---|---|---|
| PTMG2000-PPG2000-PEG8300* | 12,844 | 61.8 |
| PTMG2000-PPG2000-PEG3000* | 7,544 | 54.8 |
| PTMG2000-PPG2000-PEG2000* | 6,544 | 51.4 |
| PTMG1000-PPG1000-PEG1000* | 3,545 | 35.5 |
| PTMG1000-PPG1000-PEG1000 | 3,436 | 35.0 |
| PTMG1000-PPG1000-PEG800 | 3,236 | 28.4 |
| PTMG850-PPG400-PEG1000 | 2,488 | 39.8 |
| PCL530-PPG400-PEG1000 | 2,366 | 38.8 |
| PCL830-PPG950-PEG400 | 2,616 | 35.5 |
| PMVA2000-PPG400-PEG1000 | 3,836 | 36.4 |
| PMPA1000-PPG400-PEG1000 | 2,836 | 37.7 |
| PTMG2000-PPG600-PEG1000-PEG600 | 4,973 | 24.0 |
| PTMG3000-PPG2000-PEG1000-PEG2000-PEG1000 | 9,722 | 39.8 |
| PTMG3000-PPG2000-PEG1000-PEG1000-PEG1000 | 8,722 | 37.8 |
| PTMG2000-PPG2000-PEG600-PEG1000-PEG600 | 6,972 | 22.2 |
| PTMG2000-PPG2000-PEG1000-PEG1000-PEG1000-PEG1000 | 8,940 | 37.7 |
| PCL530-PPG400-PEG1000-PEG600-PEG1000 | 4,302 | 37.9 |
| PCL530-PPG400-PPG400-PEG1000 | 3,502 | 37.4 |

TABLE 3-continued

| Segments | Molecular Weight | M.P. DSC (°C.) |
|---|---|---|
| PEG1000-PPG400-PCL530-PPG400-PEG1000 | 4,003 | 41.7 |

*IPDI (isophorone diisocyanate) was used as the isocyanate component; and HMDI (hexamethylene diisocyanate) was used in the other cases; the hydrophobic terminal group was blocked with the N—C$_4$H$_9$NHCOO— group.

The difference of the molecular weight in the same segment results from the difference of the molecular weight of the isocyanate component used.

PEG: Polyethylene glycol
PPG: Polypropylene glycol
PTMG: Polytetramethylene glycol
PCL: Poly-ε-caprolactone glycol
PMVA: Polymethylvalerolactone adipate
PMPA: Poly-3-methylpentane-1,5-diol adipate As these results show the amphiphilic segment polyurethanes of the present invention are composed of alkylene oxide segments linked by a urethane bond, having a hydrophilicity-hydrophobicity tapered structure in which the segments vary in stepwise fashion from hydrophilic to hydrophobic from one end of the polymer molecule to the opposite end thereof. For this reason, they have a higher emulsifying power than low molecular surfactants and can form a stable emulsion. In addition, these have excellent dispersibility and solubilization power and are practically non-toxic. Moreover, the segment polyurethanes having a high molecular weight have a high viscoelasticity strength, easily shaped, and free from the mutual interference of the segments. Accordingly, the difference in the hydrophilicity or hydrophilicity of the respective segments can effectively be utilized for selective permeation of solvents, the sustained release of durgs and many other valuable applications in addition to those specifically illustrated in the above Examples. The amphiphilic segment polyurethanes of the present invention can be adapted to various uses, including polymeric emulsifiers, separation membranes, drug bases capable of gradual and sustained release, liquid membranes, ionic conductors, and thus are extremely useful polymers.

While the invention has been described in detail and with reference to specific embodiments thereof, it will be apparent to one skilled in the art that various changes and modifications can be made therein without departing from the spirit and scope thereof.

What is claimed is:

1. An amphiphilic segment polyurethane represented by the following general formula (A):

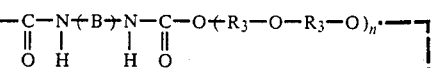

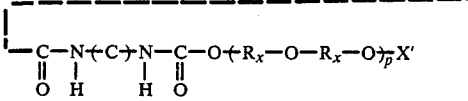

wherein (S) is selected from the group consisting of (a) a polyalkylene oxide segment represented by the following general formula (I):

(b) an aliphatic polyester segment which is a reaction product of a dibasic acid and a dihydric alcohol represented by the following general formula (II):

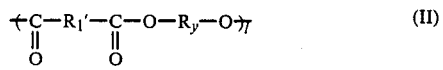

and (c) a polyester segment which is the reaction product of a ring-cleaved polymer of a cyclic ester and a dihydric alcohol represented by the following general formula (III):

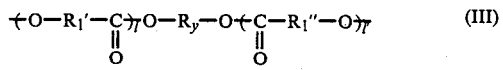

wherein $R_1$, $R_2$, $R_3$ and $R_x$ each represents an alkylene group having from 7 to 2 carbon atoms, which may be unsubstituted or substituted with a side chain, forming an alkylene oxide segment; $R_y$ represents an alkylene group of polyester-forming dihydric alcohol; $R_1'$ and $R_1''$, which may be the same or different, each represents an alkylene group having from 7 to 2 carbon atoms; —OX represents a group selected from the group consisting of

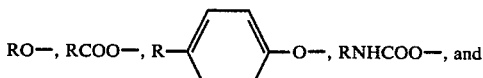

wherein R represents an alkyl group having 1 to 18 carbon atoms or a vinyl group and ⓘ represents an isocyanate skeleton group; —OX' represents a group selected from the group consisting of —OH, —OCl, —OBr and —OF; (A), (B) and (C), which may be the same or different, each represents an isocyanate skeleton group; m, n, p, l and l' each is a positive integer; l and l' may be the same or different; said polyurethane being a tapered hydrophobicity-hydrophilicity polyurethane.

2. The amphiphilic segment polyurethane as claimed in claim 1, wherein said group (S) is represented by general formula (I), and the number of carbon atoms in each group of the series $R_1$, $R_2$, $R_3$ and $R_x$ is less than the number of carbon atoms in the previous alkylene groups of the series from $R_1$, $R_2$, $R_3$ and $R_x$; provided that the number of carbon atoms in any two immediately adjacent members of the series R, $R_2$, $R_3$ and $R_x$ may be equal, and any alkylene oxide group containing said alkylene group of the series from $R_1$, $R_2$, $R_3$ and $R_x$ may be omitted.

3. The amphiphilic segment polyurethane as claimed in claim 1, wherein said group (S) is represented by general formulae (II) or (III), the total number of carbon atoms in $R_1'$ is greater total number of carbon atoms in $R_2$; $R_2$ to $R_x$ each represents an alkylene group having from 4 to 2 carbon atoms, the number of carbon atoms in each group of the series $R_2$ to $R_x$ being less than the number of carbon atoms in the previous alkylene groups of the series from $R_2$ to $R_x$; provided that the number of carbon atoms in any two immediately adjacent members of the series $R_2$ to $R_x$ may be equal, and any alkylene oxide group containing said alkylene group of the series from $R_2$ to $R_x$ may be omitted.

4. The amphiphilic segment polyurethane as claimed in claim 1, wherein said polyurethane is at least a ternary polymer comprising at least three different segments selected from the group consisting of alkylene oxide segments and alkylene oxide polyester segments.

5. The amphiphilic segment polyurethane as claimed in claim 4, wherein the difference in the number of carbons in said alkylene group $R_1$, $R_2$, $R_3$ and $R_x$ forming the adjacent alkylene oxide segment is 3 of less, and the difference between the number of carbons in said polyester segment and the number of carbons in said alkylene group $R_1$, $R_2$, $R_3$ and forming the adjacent polyester segment or polyalkylene oxide segment is 3 or less.

6. The amphiphilic segment polyurethane as claimed in claim 2, wherein said alkylene group $R_x$ in the alkylene oxide segment adjacent to —OX' has from 1 to 3 carbon atoms, and said alkylene group $R_1$ in said polyalkylene oxide segment has from 4 to 7 carbon atoms.

7. The amphiphilic segment polyurethane as claimed in claim 3, wherein said alkylene group $R_x$ in the alkylene oxide segment adjacent to —OX' has from 1 to 3 carbon atoms, and the number of carbon atoms in each of said alkylene groups $R_y$; $R_1'$ and $R_1''$ in said polyester segment represented by formulae (II) or (III) is at least 5.

8. The amphiphilic segment polyurethane as claimed in claim 1, wherein said polyalkylene oxide segment (S) represented by general formula (I) is selected from a polyethylene glycol, a polypropylene glycol, a polytetramethylene glycol, a polypentamethylene glycol, a polyhexamethylene glycol, and a polyheptamethylene glycol; said polyester segment (S) represented by general formula (II) has at least 5 carbon atoms per the polyester unit, and is the reaction product of a dibasic acid and a dihydric alcohol; and said polyester segment (S) represented by general formula (III) is the reaction product of a poly-ε-caprolactone or a poly-β-methyl-δ-valerolactone and an alkylene glycol; wherein said dihydric alcohol and alkylene glycol of the formulae (II) and (III) is selected from a polyethylene glycol, a polypropylene glycol and a polytetramethylene glycol.

9. The amphiphilic segment polyurethane as claimed in claim 1, wherein each isocyanate skeleton compound in the series (A) to (C) has a mean solubility parameter value between the solubility parameter values of the adjacent segments.

10. The amphiphilic segment polyurethane as claimed in claim 1, wherein the segment (I) has a molecular weight of about 200 to 5,000, the segment (II) has a molecular weight of about 500 to 3,000, and the segment (III) has a molecular weight of about 500 to 3,000.

11. The amphiphilic segment polyurethane as claimed in claim 1, which has a molecular weight of about 1,500 to 20,000.

* * * * *